Inventor
Wilhelm Kopp &
Hermann Ploss
by Michael S. Striker
agt.

April 18, 1961 W. KOPP ET AL 2,980,000

CAMERAS

Filed March 25, 1957 14 Sheets-Sheet 2

Inventor
Wilhelm Kopp &
Hermann Ploss
by Michael S. Striker
agt.

CAMERAS

Filed March 25, 1957

Inventor
Wilhelm Kopp &
Hermann Ploss
by Michael S. Striker
agt.

April 18, 1961 W. KOPP ET AL 2,980,000

CAMERAS

Filed March 25, 1957 14 Sheets-Sheet 4

Inventor
Wilhelm Kopp &
Hermann Ploss
by Michael S. Striker
agt.

Inventor
Wilhelm Kopp &
Hermann Ploss
by Michael S. Striker
agt.

Inventor
Wilhelm Kopp &
Hermann Ploss
by Michael S. Striker
agt.

April 18, 1961 W. KOPP ET AL 2,980,000

CAMERAS

Filed March 25, 1957 14 Sheets-Sheet 7

Inventor
Wilhelm Kopp &
Hermann Ploss
by Michael S. Striker
agt.

Inventor
Wilhelm Kopp &
Hermann Ploss
by Michael S. Striker
agt.

April 18, 1961 W. KOPP ET AL 2,980,000

CAMERAS

Filed March 25, 1957 14 Sheets-Sheet 9

Inventor
Wilhelm Koppe
Hermann Ploss
by Michael S. Striker
agt.

Inventor
Wilhelm Kopp &
Hermann Ploss
by Michael S. Striker
agt.

April 18, 1961 W. KOPP ET AL 2,980,000

CAMERAS

Filed March 25, 1957 14 Sheets-Sheet 11

Inventor
Wilhelm Kopp &
Hermann Ploss
by Michael S. Striker
agt.

April 18, 1961 W. KOPP ET AL 2,980,000

CAMERAS

Filed March 25, 1957 14 Sheets-Sheet 12

Inventor
Wilhelm Kopp &
Hermann Ploss
by Michael S. Striker
agt.

CAMERAS

Inventor
Wilhelm Kopp &
Hermann Ploss
by Michael S. Striker

CAMERAS

Inventor
Wilhelm Kopp &
Hermann Ploss
by Michael S. Striker
agt.

United States Patent Office 2,980,000

Patented Apr. 18, 1961

2,980,000

CAMERAS

Wilhelm Kopp, Wiesbaden-Bieberich, and Hermann Ploss, Frankfurt am Main, Germany, assignors to Adox Kamerawerk G.m.b.H., Wiesbaden-Bieberich, Germany Filed Mar. 25, 1957, Ser. No. 648,180

Claims priority, application Germany June 21, 1954

15 Claims. (Cl. 95—31)

This invention relates to improvements in photographic roll film cameras of the type with which our co-pending application Ser. No. 516,886 now Patent Number 2,924,158 is concerned, which comprise exchangeable magazine, which is introduced into the camera from the rear side and placed against the front of the camera, in which a back wall of the housing pivoted to the camera is resiliently pressed in its closed position in the direction of the optical axis against the interchangeable magazine whch has been introduced and presses this on to a supporting surface in the camera housing, and in which a reciprocal locking is provided between the shutter of the rear wall of the housing and the shutter of the picture aperture of this exchangeable magazine, which locking device locks the shutter of the rear wall of the housing, when the picture aperture is opened and vice versa, when the picture gate shutter is completely closed, the locking of the rear wall of the housing is set free.

An object of the present invention of the photographic roll film camera in accordance with the main application, is to simplify the industrial production of this camera as well as to provide for a more simple and reliable operation by the user. In accordance with the present invention there is movably mounted in the camera housing a slide, which co-operates with the covering slide of the picture gate of the interchangeable film holder, by virtue of the fact that a shutter slide for the locking of the camera housing possesses a control surface, which in the open position of the locking slide of the housing lies in the plane of action of the slide co-operating with the picture gate shutter of the film holder, and in its closed position lies outside of this plane of action.

The invention includes two embodiments of the movable slide mounted in the camera housing and co-operating alternately with the locking of the camera housing and the actuation of the covering slide of the picture gate. In the one case this movable slide is, for example, movably mounted on the floor of the camera housing parallel to the covering slide of the picture gate, while the locking slide for the camera housing is movable vertically in this housing to the first-mentioned slide. It is then expedient to fix on the slide co-operating with the picture gate shutter of the film holder a control knob slidable in a slot in the housing, which knob is provided at the end projecting into the inside of the camera with a pawl in which there engages a rod mounted on the locking slide of the picture gate of the interchangeable film holder.

In the other embodiment the control knob is rotatably mounted in a wall of the housing, preferably on the floor of the housing, and it carries on its pin projecting into the housing a disc with two control members, of which one acts on the slide co-operating with the picture gate covering slide of the film holder, and the other co-operates with the locking surface of the locking slide of the camera housing.

With both forms of embodiment an auxiliary slide, which is preferably loaded with a tension spring, can be coupled positively between the slide co-operating with the covering slide of the picture gate shutter of the interchangeable film holder and the locking slide for the housing shutter.

In order to prevent, when the picture gate is closed, unexposed film from moving past the picture gate shutter, owing to the actuation of the rewinding spool, and thus becoming spoiled, which could happen especially when the magazine is in the loaded condition outside the camera housing, one, or preferably two locking levers are mounted on the interchangeable film holder. These levers engage in grooves and are preferably spring-loaded, one being connected with the film measuring roller and the other with the picture gate shutter of the film holder. There is furthermore provided on the camera housing a shoulder which, when the magazine is introduced into the housing, acts on the two locking levers and moves them out of the said grooves. The two locking levers are preferably mounted on a common spindle and are pressed into the grooves by means of a common pressure spring.

In accordance with a special feature of the invention, the common pressure spring has the shape of a hairpin, and by the shaping of the curvature to a loop between the arms and the positioning of one part of the loop in a rectilineal, obliquely running slot in the bolt for supporting the spring such a degree of prestressing is applied to both arms of the spring that the two arms act in the same direction on the two locking levers.

The invention is further illustrated by embodiments described with reference to the accompanying drawings, which however are to serve only for the fuller comprehension of the invention and are not to be understood in any restricting sense.

Figures 1 to 16 show an embodiment of the flexible slide with a drum segment as drive, in which Figure 1 shows a cross-section, taken along line 1—1 of Fig. 6 and viewed in the direction of the arrows, through the film rewinding spool with the drum segment and the coupling member for its actuation.

Figure 2 shows the drum segment seen from above with open picture gate.

Figure 3 shows the drum segment seen from above with closed picture gate.

Fig. 4 shows the drum segment in cross-section with a part of the covering slide.

Figure 5 shows the covering slide seen from the front.

Figure 6 shows on an enlarged scale a part of Figure 2.

Figure 7 shows the drum segment with covering slide fixed on same, removed from the apparatus.

Figure 8 shows the drum segment without covering slide with notches for the engagement of the toothed wheels of the film feed device.

Figure 9 is a drawing on an enlarged scale of a part of the interchangeable film holder.

Figure 10 shows the guide-plate for the covering slide seen from the rear in the direction of the picture gate.

Figure 11 shows a cross-section taken along line 11—11 of Figure 10.

Figure 12 shows a cross-section taken along line 12—12 of Figure 10.

Figure 13 shows a cross-section taken along line 13—13 of Figure 10 on an enlarged scale with a part of the front wall of the film holder.

Figure 14 shows a cross-section taken along line 14—14 of Figure 10 on an enlarged scale.

Figure 15 shows the front wall of the interchangeable film holder with built-in guide-plate.

Figure 16 shows a cross-section taken along line 16—16 of Figure 15.

Figure 1:
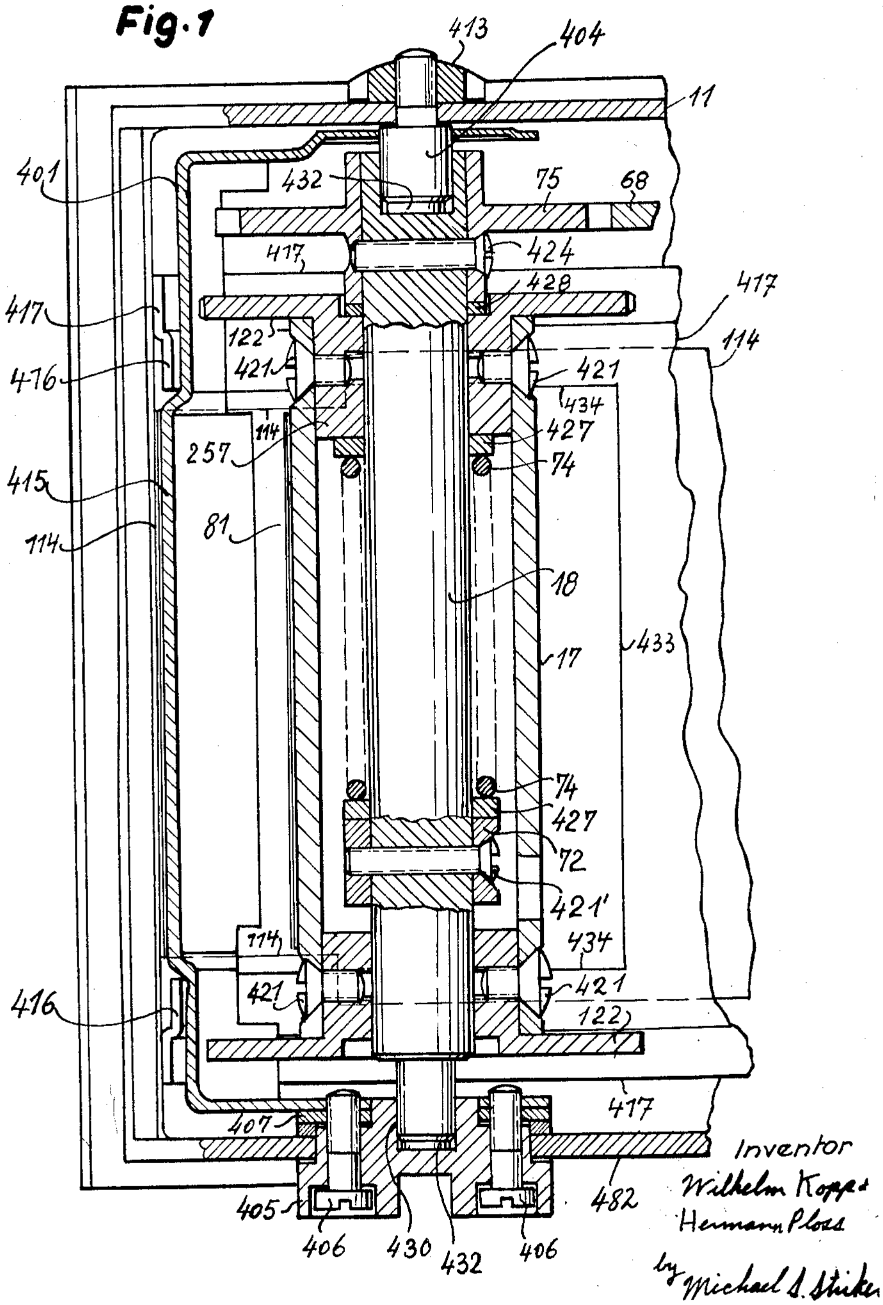
Figures 2, 3, 4, 5:
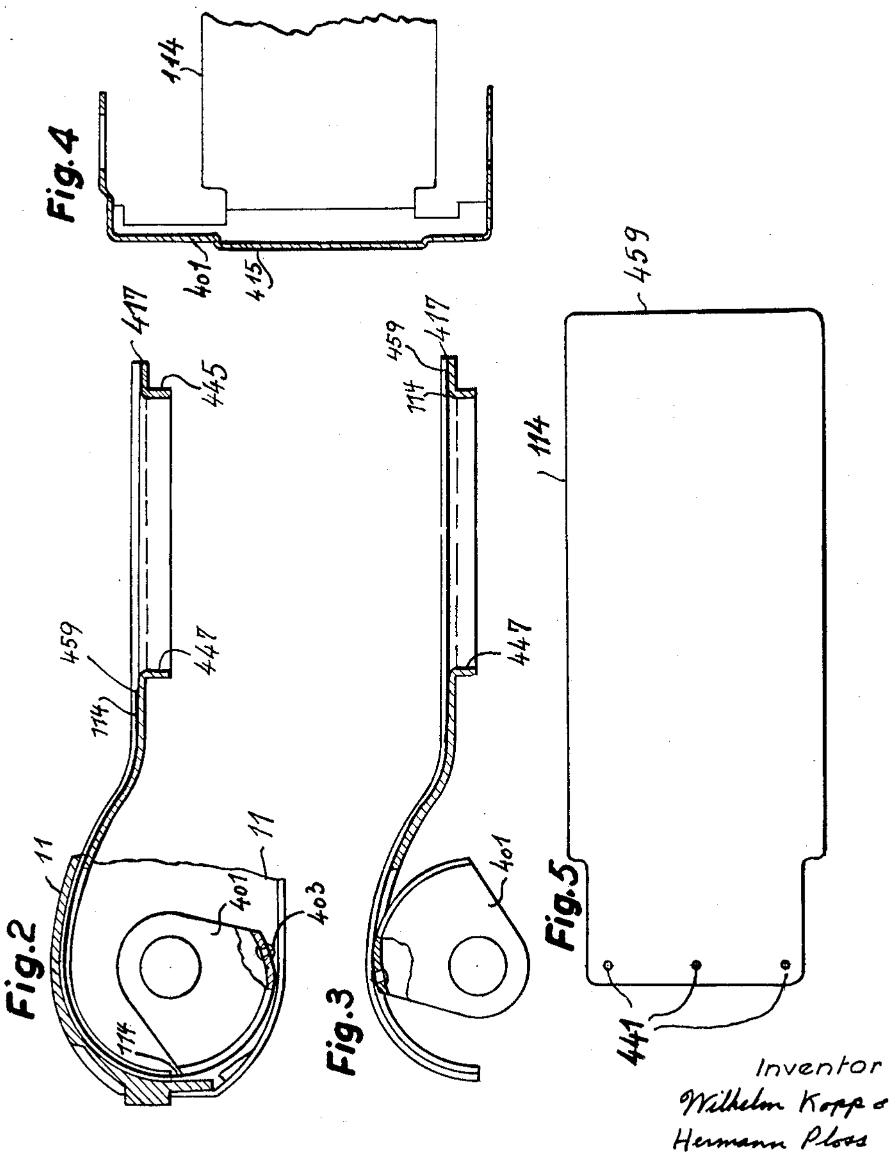
Figure 20:
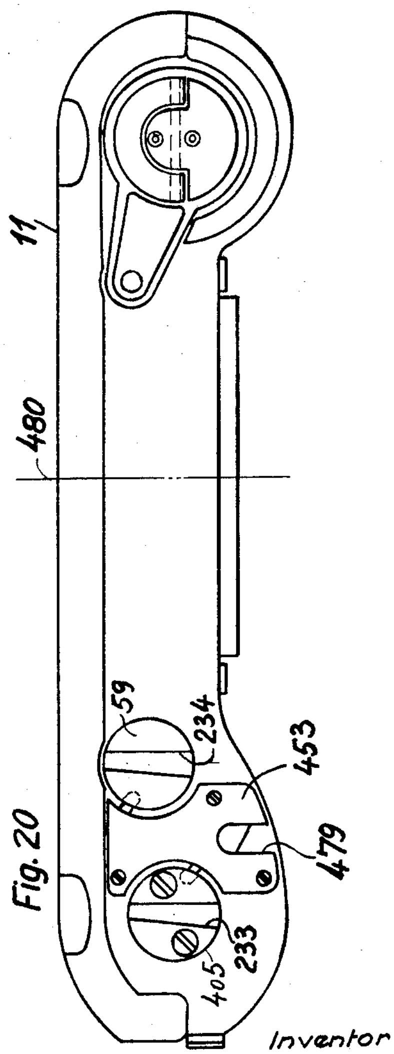
Figure 20 shows a closed interchangeable film holder seen from below.
Figure 18:
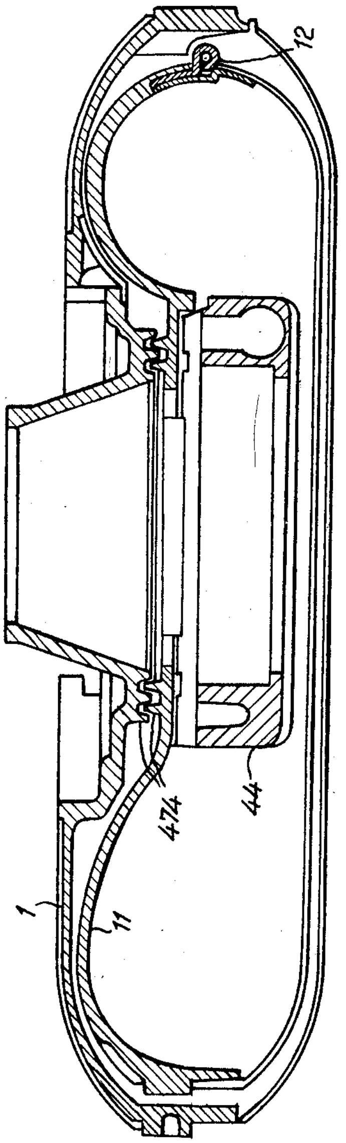
Figure 18 shows the camera front wall according to Figure 17 with interchangeable film holder and film trap introduced into the front wall of the camera, in cross-section seen from above.
Figures 21, 22:
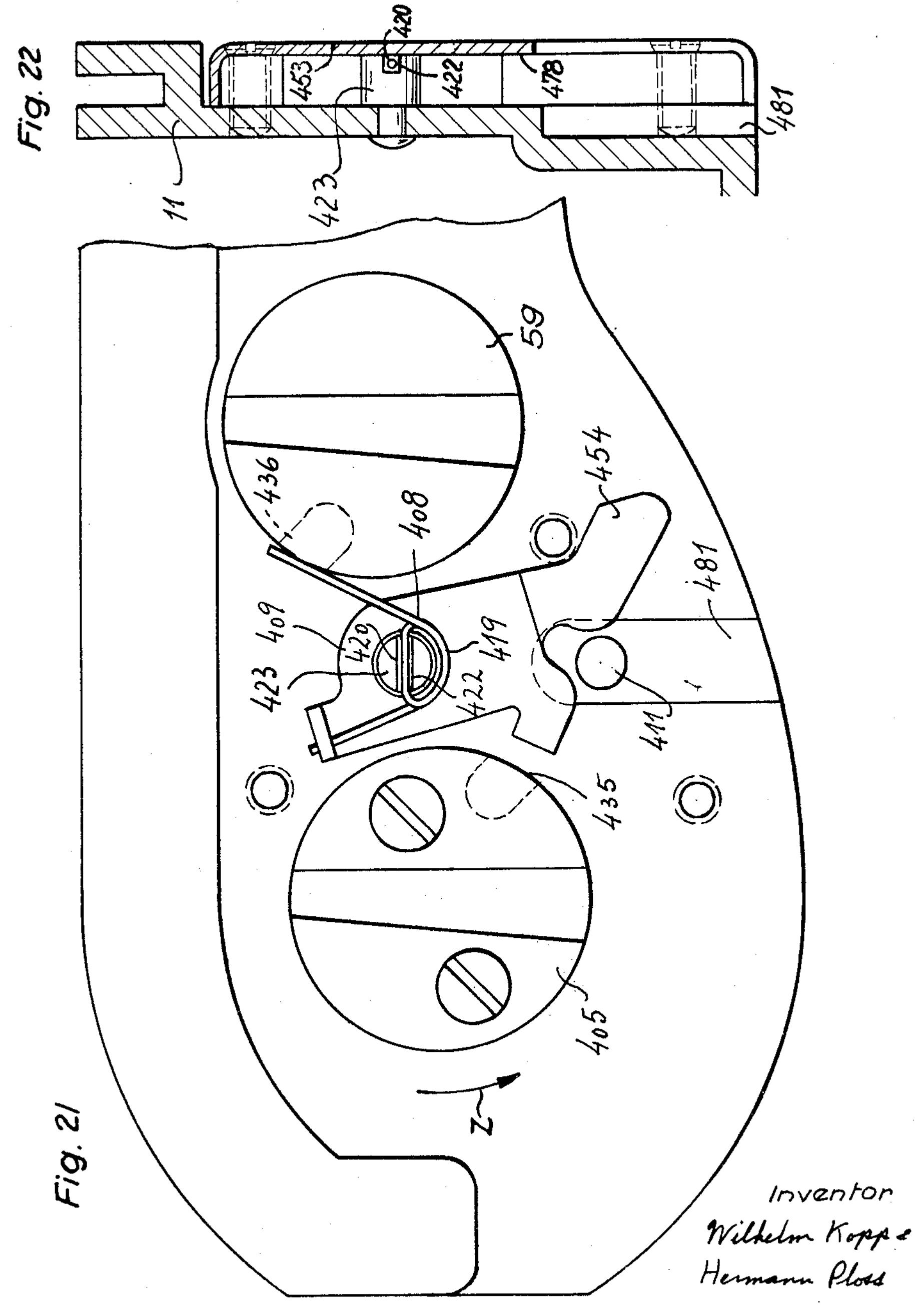
Figure 21 shows a part of the interchangeable film holder of Figure 20 seen from below on an enlarged scale, but without covering flap with the lower locking lever.
Figure 22 shows a cross-section through the locking lever support.
Figures 23, 24:
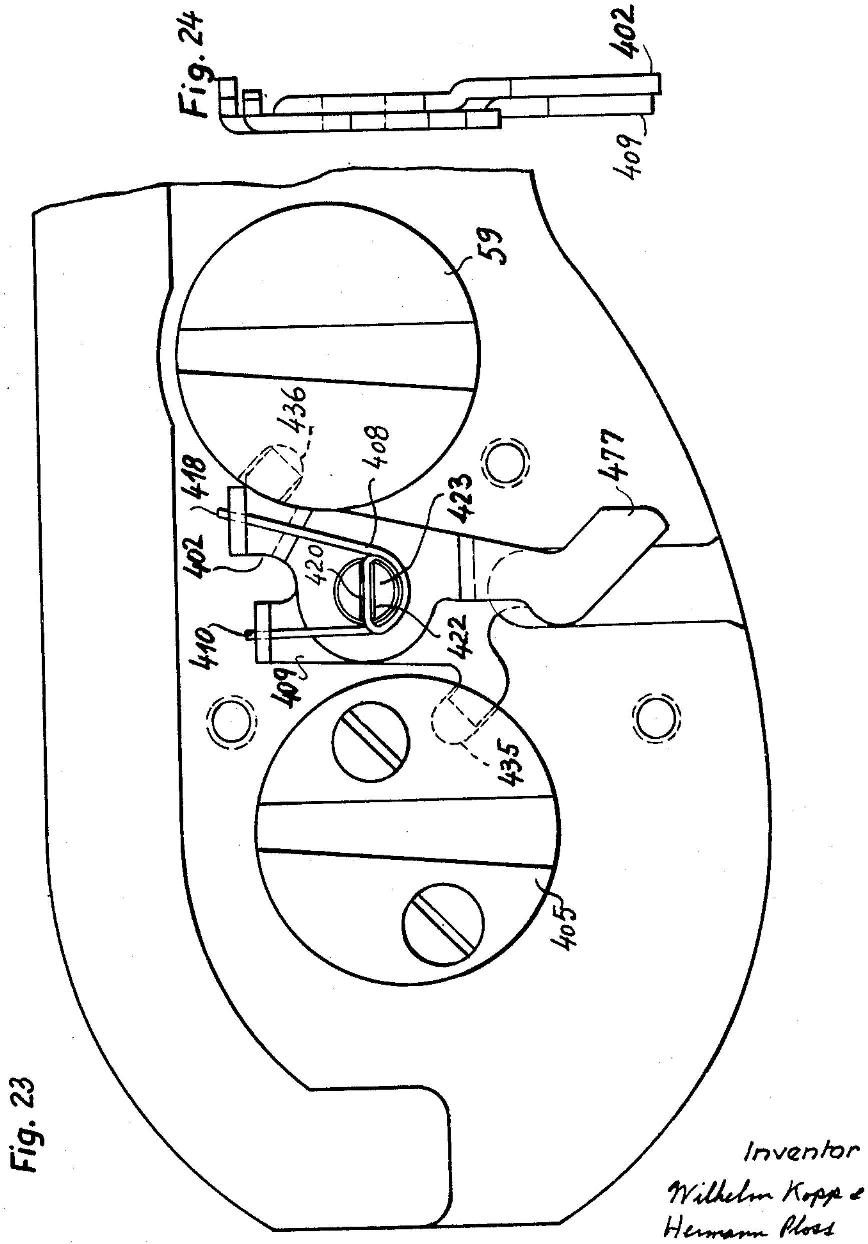
Figure 23 shows the two locking levers for the drum segment and for the film measuring roller supported over one another in the grooves.
Figure 24 shows the two locking levers according to Figure 23 seen from the side.
Figure 25:
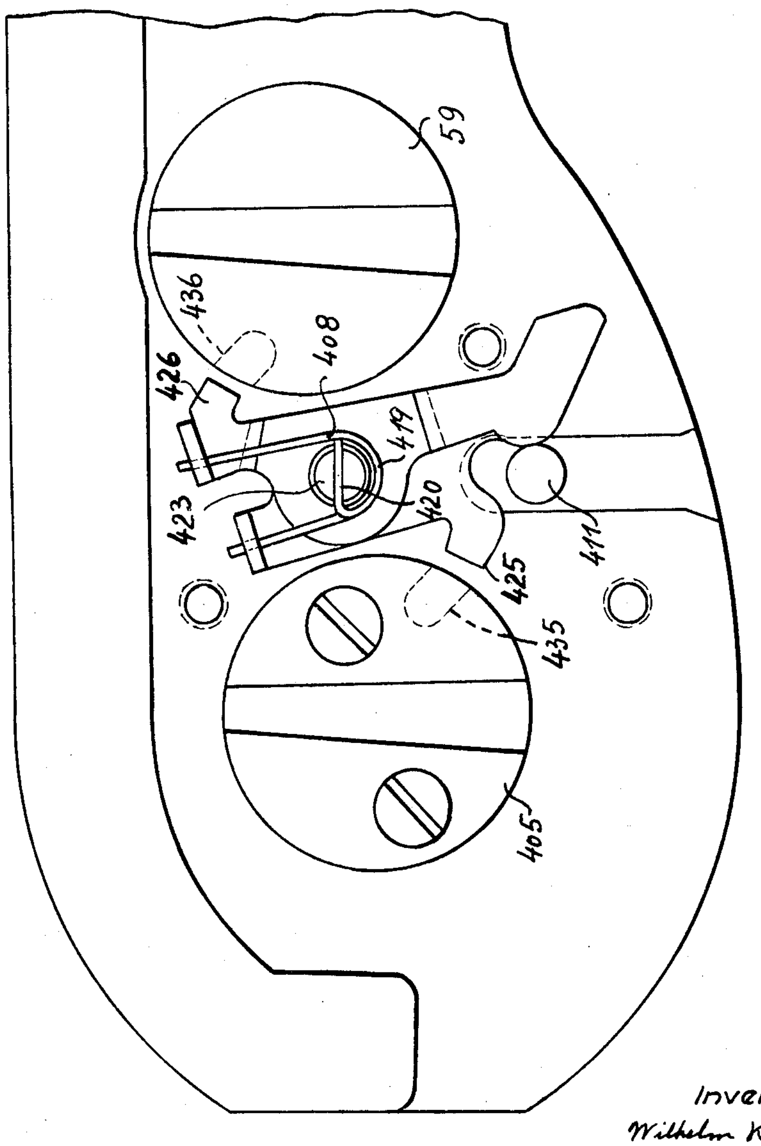
Figure 25 shows the two locking levers according to Figure 23, but held outside the groove by means of the stop pin located in the housing of the camera.

In Fig. 1 there can be seen a drum segment 401 in cross-section to which segment the flexible covering slide 114 is fixed by means of rivets 403, as can be seen in Fig. 2. A coupling member 405 is shown in cross-section. In this embodiment this coupling member 405 is connected with the drum segment 401 by means of screws 406. The drum segment 401 has on its lower side a reinforcement 407 in order to obtain a better fastening for the screws 406. The coupling member 401 is rotatably mounted in the housing 11 of the interchangeable film holder 11, 13. The rotation of the coupling member 405 is blocked in one direction of rotation by means of a locking lever 409 (see Fig. 21). In the other direction of rotation a stop, which is not shown in the drawing, prevents the rotation of the drum segment 401, e.g. above 180°. In Figs. 20, 21 and 23 the coupling member 405 is shown in the position in which it must lie when the magazine of the interchangeable film holder 11, 13 is inserted in the camera 1. The drum segment 401 is supported on its upper end on a pin 404, which is fixed in the housing 11, for example, by means of a nut 413. The drum segment 401 has a reinforcement 415, which is so dimensioned that it comes about 0.1 mm. below the inner surfaces of the round part 416 of the guide plate 417. The spindle 18 of the film spool 17 is supported coaxially with the drum segment 401. The film spool 17 consists in the example of this embodiment of a tubular part 17 and, two flanges 122, which are held on the tubular part 17 by screws 421. A spring 81 is connected with the tubular part 17. Below this spring 81 the beginning of a film strip 10 can be fixed. A toothed wheel 75 is fixed on the shaft 18. For this purpose a screw 424 is used. Opposite the toothed wheel 75 there is a ring 72, which is fixed to the spindle 18 by means of the screw 421. A pressure spring 74 abuts over two supports 427 at one end against the ring 72 and at the other end against the upper flange 122 and over a ring 428 against the toothed wheel 75. By the variation of the thickness of the ring 428, which is located just beneath the gear 75, the film spool 17, 122 can be adjusted centrally to the cross-section. The flanges 122 are rotatably mounted on the spindle 18. The spindle 18 is supported on the one side on the pin 404 and on the other side in the boring 430 of the coupling member 405. Two supports 432 are interposed at the ends of spindle 18 as adjusting media for the play of the spindle 18.

Figure 16:
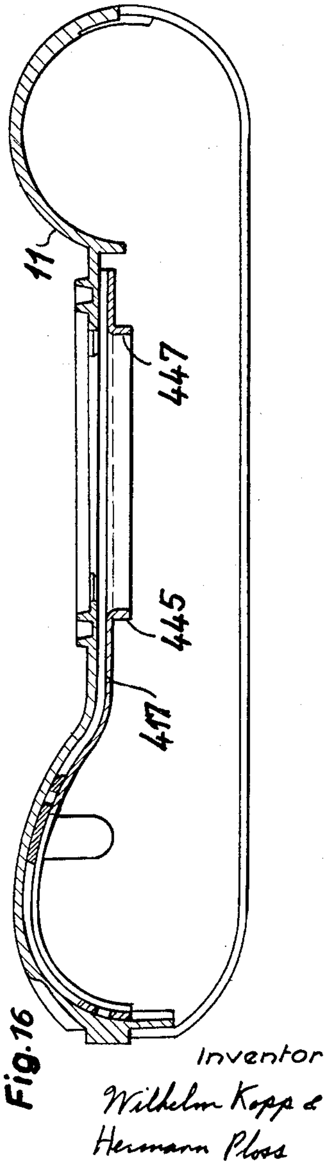

The diameter of the flanges 122 is about 1.4 mm. smaller than the smallest internal diameter of the drum segment 401. The reinforcement 415 of the drum segment 401 is about 25 mm. wide, so that in the case of an "overrunning" with a fully wound film spool 17, 122, the 24 mm. wide film strip cannot be scratched. The guide plate 417 is rigidly connected with the housing 11 (Fig. 16). To permit the drum segment 401 to rotate, the guide plate 417 is provided in the region of the bearing surface of the drum segment 401 with a cut-out part 433 (Fig. 10), so that at this part only two arms 434 remain for the guidance of the cover slide 114. These two arms 434 have rounded parts 416, in which in this region the cover slide 114 is guided laterally only.

Figures 6, 7, 8:
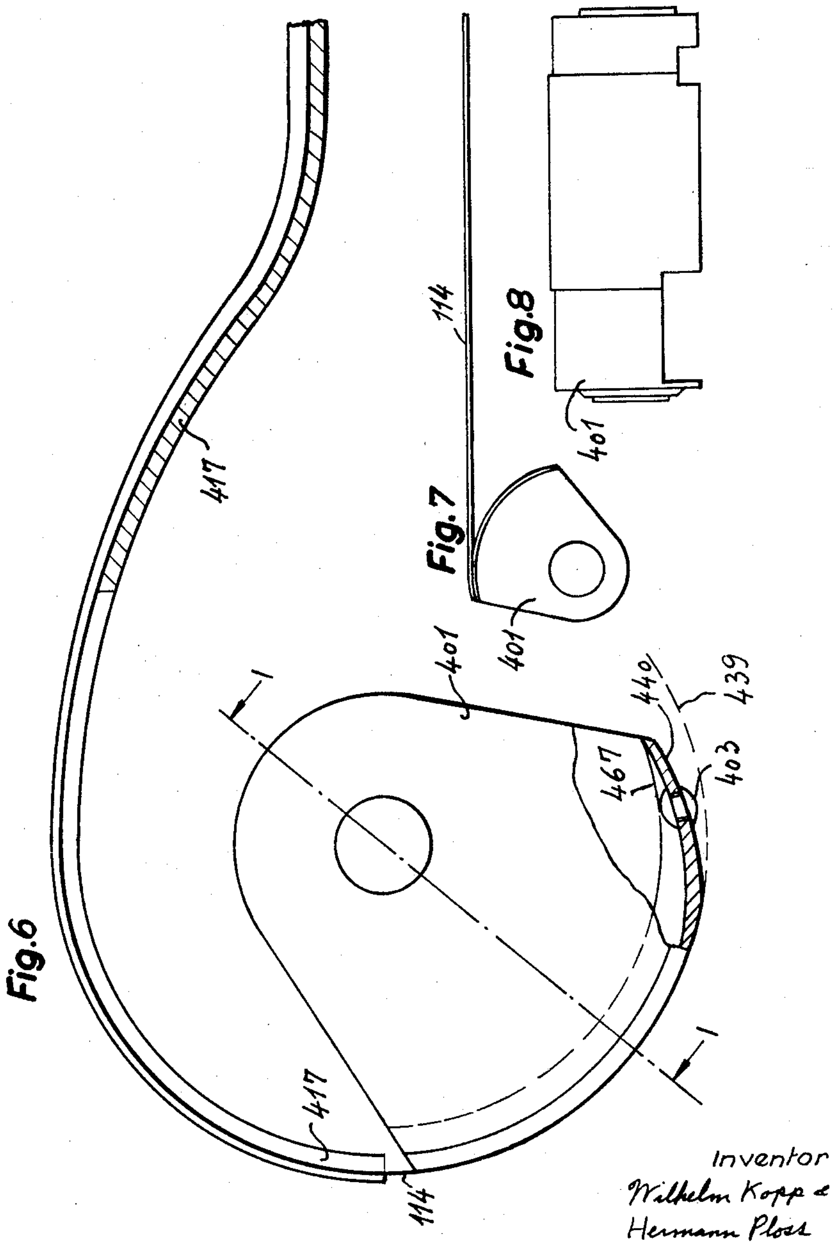

The relationship of guide plate 417 to the other elements can be seen from Figures 2, 3, 6, 10, 11 and 16. Figures 2 and 6 show the drum segment 401 with the cover slide 114 in the condition of the opened picture gate 447. The cover slide 114 is guided by the two arms 434 up to one side of the drum segment 401. The rear wall 13 of the interchangeable film holder 11 has a reinforcement, which extends the guiding of the guide plate 417 by the length of the drum segment 401 in connection with the rear wall 13 in this position, in accordance with Figures 2 and 6, when the interchangeable film holder 11 is closed by its rear wall 13. A special construction, as described below, is necessary for the drum segment 401 at the place where the cover slide 114 is fixed by means of the rivets 403 (Figures 2, 3, 6, 7). Between the cover slide 114 and the inner front wall of the housing 11 there only remains a space of about 0.3 mm.

The arrangement of grooves for rivet heads 403 in the housing 11 would make it necessary to reinforce the wall 11 at these places to a corresponding extent in the outward direction. In order to avoid this disadvantage, the drum segment 401 is, in the region of the rivets 403, bent below the outer radius 439 (Fig. 6) of the reinforcement 415 (Fig. 1), so that the rivet heads 403 do not project beyond the outer radius 439 of the reinforcement 415. The bending is in any case so slight that the inner radius 467 (Fig. 6) of the drum segment 401 is not exceeded by the bending 440. The drum segment 401 is therefore rounded off at the above-mentioned place, since the fastening of the cover slide 114 is only possible in practice by means of riveting. The material of the drum segment 401 is for manufacturing reasons about 0.5 mm. thick and the cover slide 114 is about 0.1 mm. thick, so that it is no longer possible to work with vertical drilling. The cover slide 114 is, owing to its function in this case, made from spring-hard steel strip, and it is difficult to use the spot welding process for the fixing of the cover slide 114 on to the drum segment 401. For the case where the holes 441 (Fig. 5) for the rivets 403 have to be deep-drawn, the cover slide 114 would have to be annealed at this part. Owing to this, there would be a danger that, when it is pushed into the guide groove, it would become crumpled and destroyed when the drum segment 401 is actuated. This would make the interchangeable film holder 11, 13 unusable. By means of the above-mentioned bending 440 of the drum segment 401 rivet heads 403 can be used.

Figures 10, 11, 12, 13, 14:
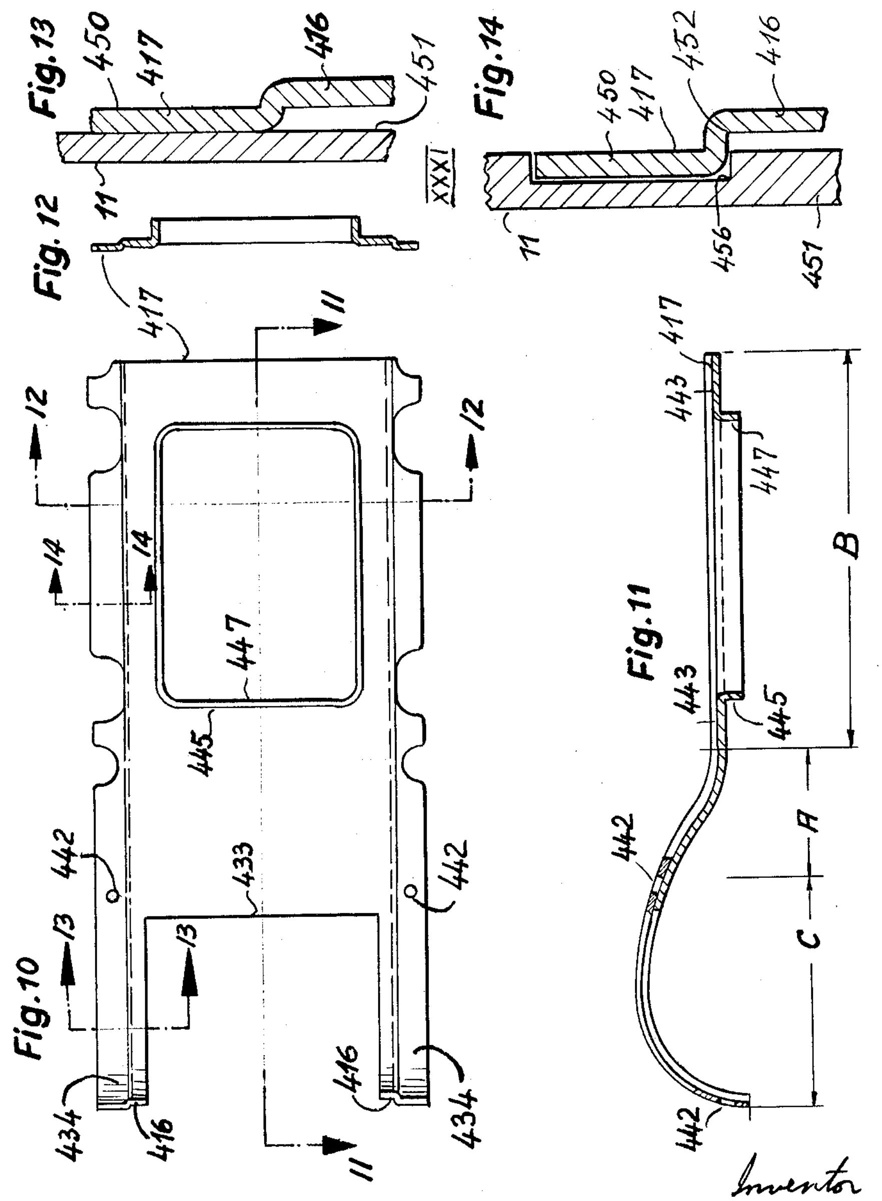
Figure 15:
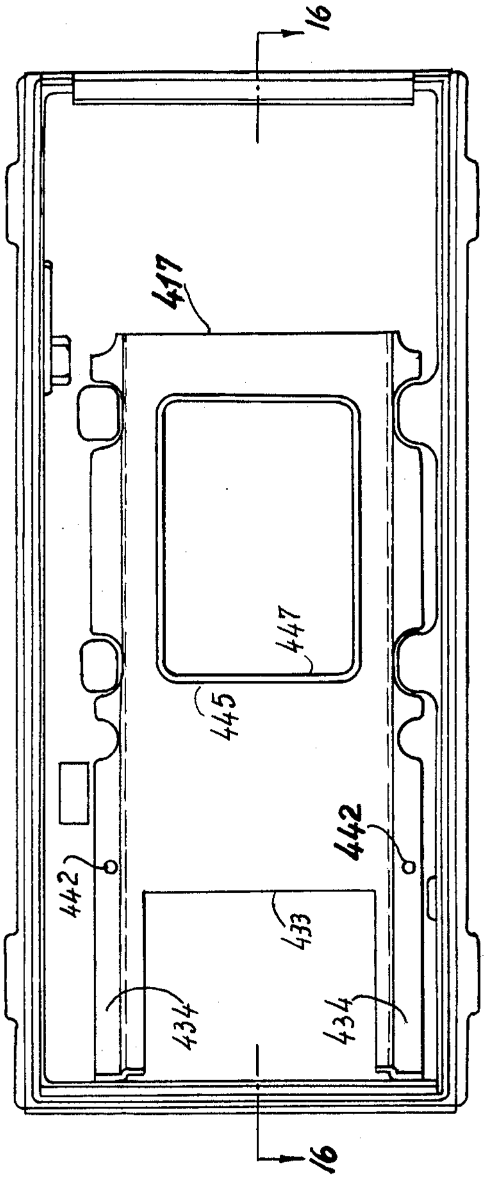

Figures 10 and 11 show the special shape of the guide plate 417, which is connected for example by riveting, at the points 442 with the housing 11 (Figures 15 and 16). For the purpose of shutting out the light a frame 445 (Fig. 16) dips into a light tunnel. 447 is the picture gate of the guide-plate 417. This picture gate 447 is, owing to the fact that it is positioned in front of the actual picture gate, correspondingly smaller.

In order that the cover slide 114 can be guided laterally, the guide plate 417 is over the region B of Figure 11, and as shown in cross-section of Figure 14, rounded off to such an extent that this rounding-off or bending 450 lies below the surface 451 of the housing 11. The guide-plate 417 is at that part so rounded-off or bent that it forms a sharp edge 452 internally. Owing to this it is impossible for the cover slide 114, in the region where it must guide itself, to come below the guide-plate and become wedged there.

In the region C of Figure 11 the rounded-off part 450 lies on the housing 11, because in this region the cover slide 114 is guided laterally by the drum segment 401. A guiding of the cover slide 114 at the edge 452 (Fig. 14) of the guide plate 417 would not be necessary in this case. It is therefore possible to make the cast housing 11 of the interchangeable film holder 11 smaller.

Figure 9:
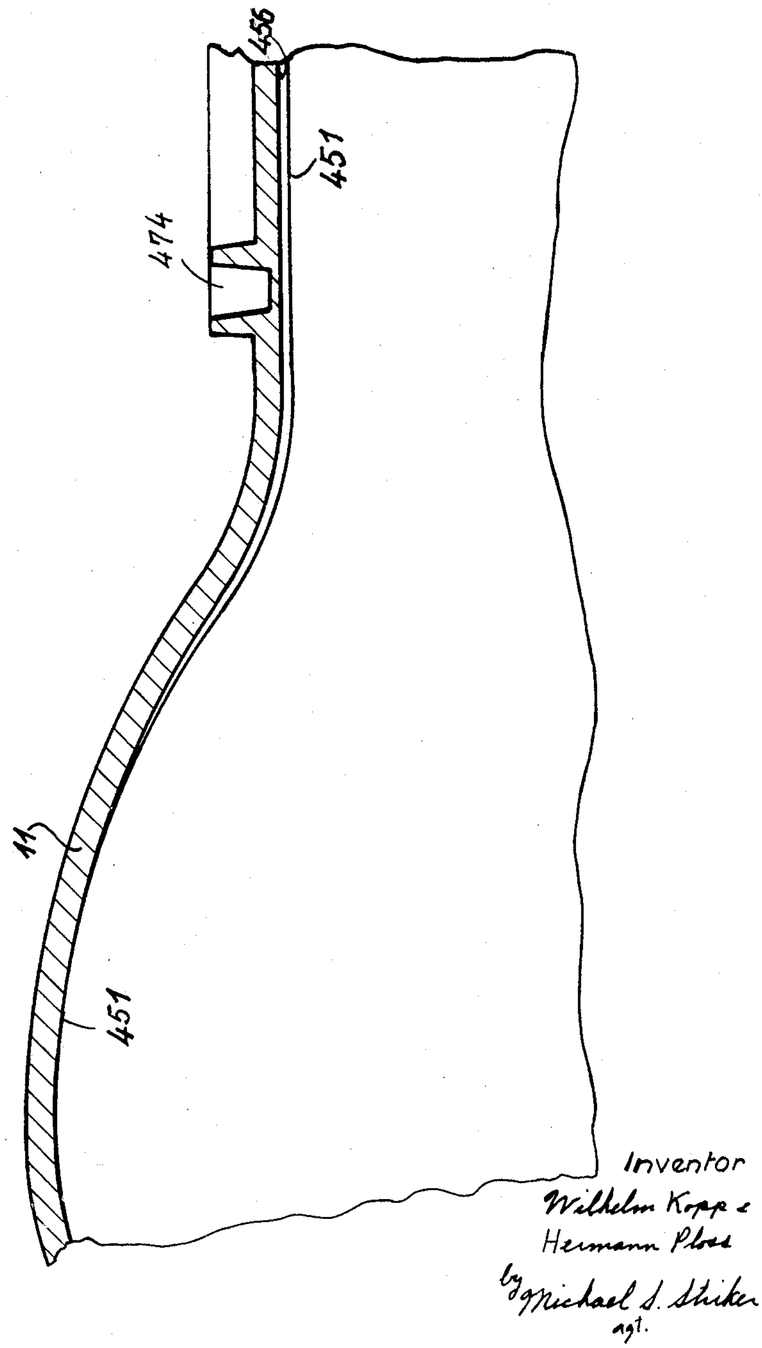
Figure 17:
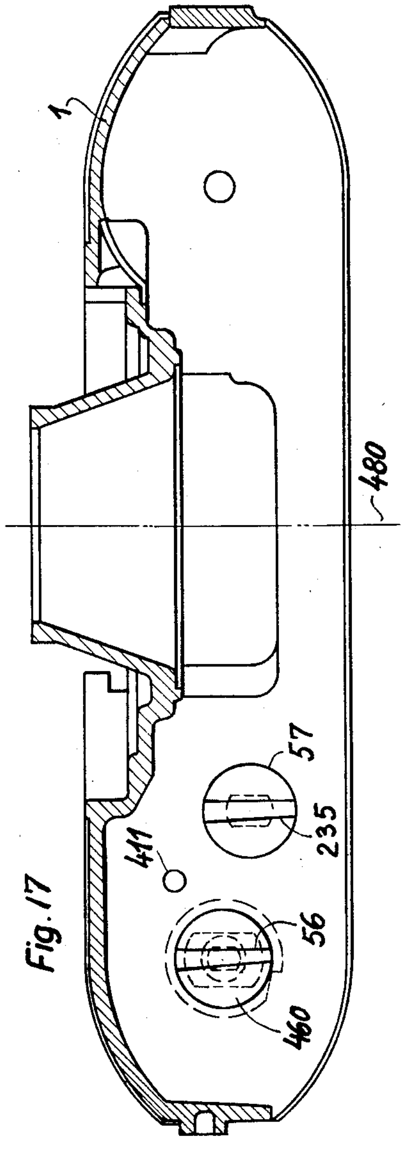
Figure 17 shows a cross-section through the camera housing.

In Figure 9 the fixing groove 456 for the guide-plate 417 is shown on an enlarged scale. This groove 456 runs in the straight path B of the guide-plate 417, according to Figures 11 and 9, below the surface 451, according to Figures 9 and 14, and in such a way that it goes over in the region C, shown in Fig. 11, into the surface 451 or ends here. The transition lies in the region A between the regions B to C. The method of operation of the drum segment with its guide path is as follows:

The drum segment 401 can be actuated by means of the coupling member 405. For this purpose, the locking lever 409 as shown in Figure 21, must be lifted out of the stop-groove 435. This takes place on the insertion of the interchangeable film holder 11, 13 into the camera 1 through the pin 411 located in the camera 1. On the rotation of the coupling member 405 in the direction of the arrow Z (Figure 21) up to a stop not shown in the drawing, the cover slide 114 is drawn away from the picture gate 447 of the interchangeable film holder 11, 13 with its edge 459, owing to which this picture gate 447 is freed. For this situation no stop-groove is provided on the coupling member 405, while this position is normally only present when the interchangeable film holder 11, 13 is inserted in the camera 1. In this case the cover slide 114 is actuated through the coupling members 405 and 460 (Fig. 17) and kept in the end position.

On the lower side of the interchangeable film holder 11, 13, between the two coupling members 59, 405 (Figs. 20–25), two locking levers 409, 402 are mounted, which on the insertion of the interchangeable film holder 11, 13 into the housing 1 are at the same time disengaged from the two coupling members 59, 405 by means of the pin 411 located on the camera 1 as best shown in Figs. 21 and 24. In addition to the locking lever 409, which acts on the drum segment 405, a second locking lever 402 is therefore arranged, through which the driving spindle of a film measuring roller can be locked by means of the coupling member 59. In order to manage with the small space which is available, these two locking levers 409, 402, are superposed over one another, and are rotatably mounted on a common spindle 423. As very little room is also available for a reliably effective tension or compression spring, a hairpin spring 408 of special construction is arranged on the same spindle 423, on which the two locking levers 409, 402, are mounted, and in such a manner that two arms of the same act in the same direction of pressure on the two locking levers 409, 402. In order that this hairpin spring 408 has a sufficiently high degree of pre-stressing, it is shaped as a loop 419 with straight middle part 420 and mounted by the middle part 420 in a groove 422 of the spindle 423.

The two superposed locking levers 409, 402 are, for the purpose of a further saving of space and at the same time with a view to greater working safety, rounded off at both ends, so that their two locking levers 425, 426 (Fig. 25) lying at the same height can engage in the stop grooves 435, 436 of the two coupling members 59, 405. As a counter-bearing for the two locking levers 409, 402, and for the special hairpin spring 408 situated above same, a protective cover 453 is present (Figs. 20 and 22). This protective cover 453 is held in such a way that it allows only the superposed arms 454, 477, of the two locking levers 409, 402 to be seen. These two arms 454, 477 are so shaped that they lie directly below the inner upper side 478 of the protective cover 453. The gap 479 (Fig. 20) of the protective cover 453 lies parallel to the optical axis 480 of the interchangeable film holder 11, 13. Below the gap 479 of the protective cover 453 a somewhat wider groove 481 (Fig. 21) is worked downwardly into the housing 11 of the interchangeable film holder 11. By these means it is possible to have the wide total tolerances in the height clearances of the two locking levers 409, 402, as well as of the pin 411 for the actuation of the locking levers 409, 402, and the fit of the housing of the interchangeable film holder 11 below the camera 1.

Owing to the arrangement described above of two locking levers 409, 402, the advantage is obtained that the two coupling members 59, 405, are locked independently of one another, which would not be the case if only one locking lever were used.

In order that the two locking levers 409, 402, should each be influenced by only one stop groove 435, 436 of the two coupling members 59, 405, the stop grooves 435, 436 of the two coupling members 59, 405 are not milled through to the bottom, so that in the region of the two locking lever-lock lugs 425, 426 a full surface is present, which is only interrupted by the stop grooves 435, 436.

Figure 26:
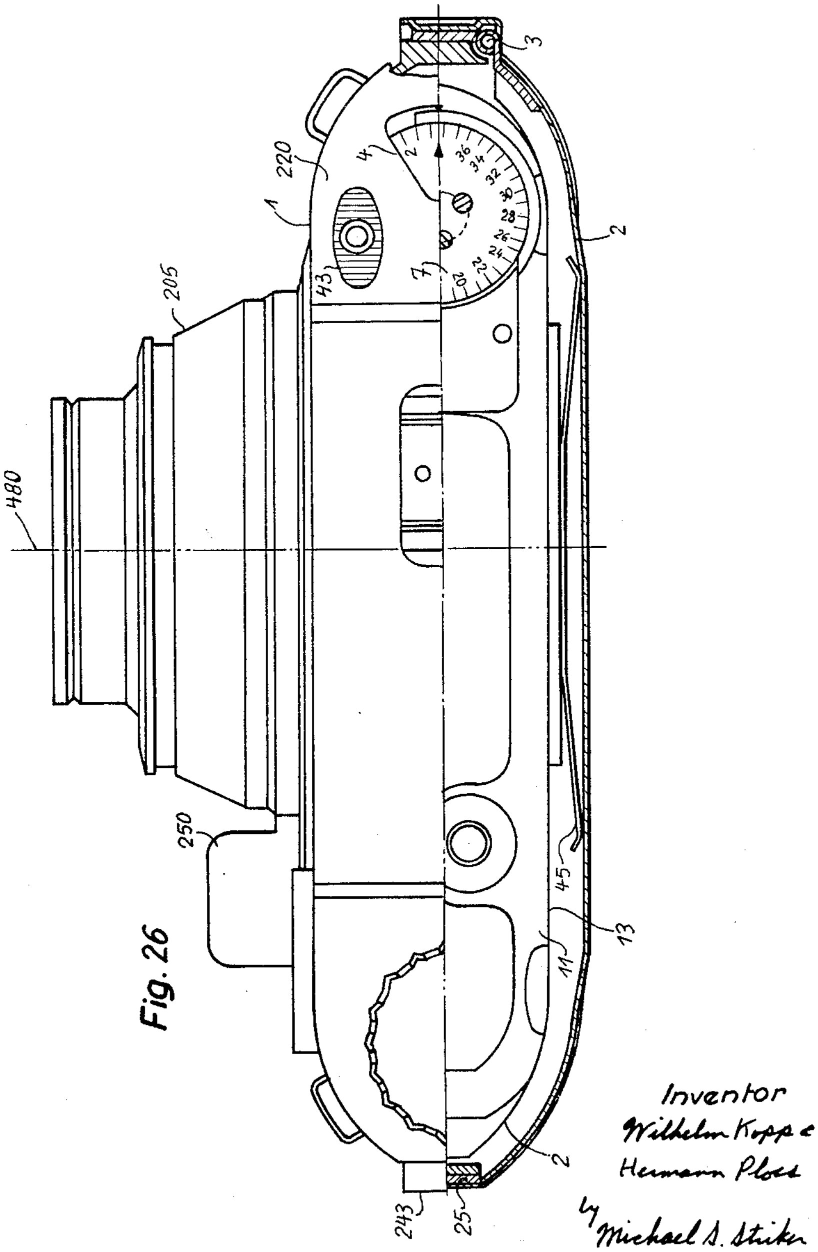
Figure 26 shows the camera with inserted interchangeable film holder, partly in cross-section, seen from above.

The method of working is as follows: When the interchangeable film holder 11, 13 is inserted in the camera housing 1, the same is pressed by its lower part 482 (Fig. 1) against a pin 411 or stop fixed in the camera 1, which pin, on the further introduction of the interchangeable film holder 11, 13, presses against the two superposed locking levers 409, 402, so that when the interchangeable film holder 11, 13 is fully inserted, the two locking levers 409, 402 are lifted out of the two stop grooves 435, 436 of the two coupling members 59, 405. In this position the interchangeable film holder 11, 13 is held by the rear wall 2 of the camera 1, when the rear wall 2 of the camera 1 is closed and locked (Fig. 26). The pressure spring 45 of the rear camera wall 2 is stronger than the action of the hairpin spring 408 of the locking levers 409, 402. Moreover, by means of the pin 411 a lateral guiding for the interchangeable film holder 11 in the camera 1 is attained.

Figure 19:
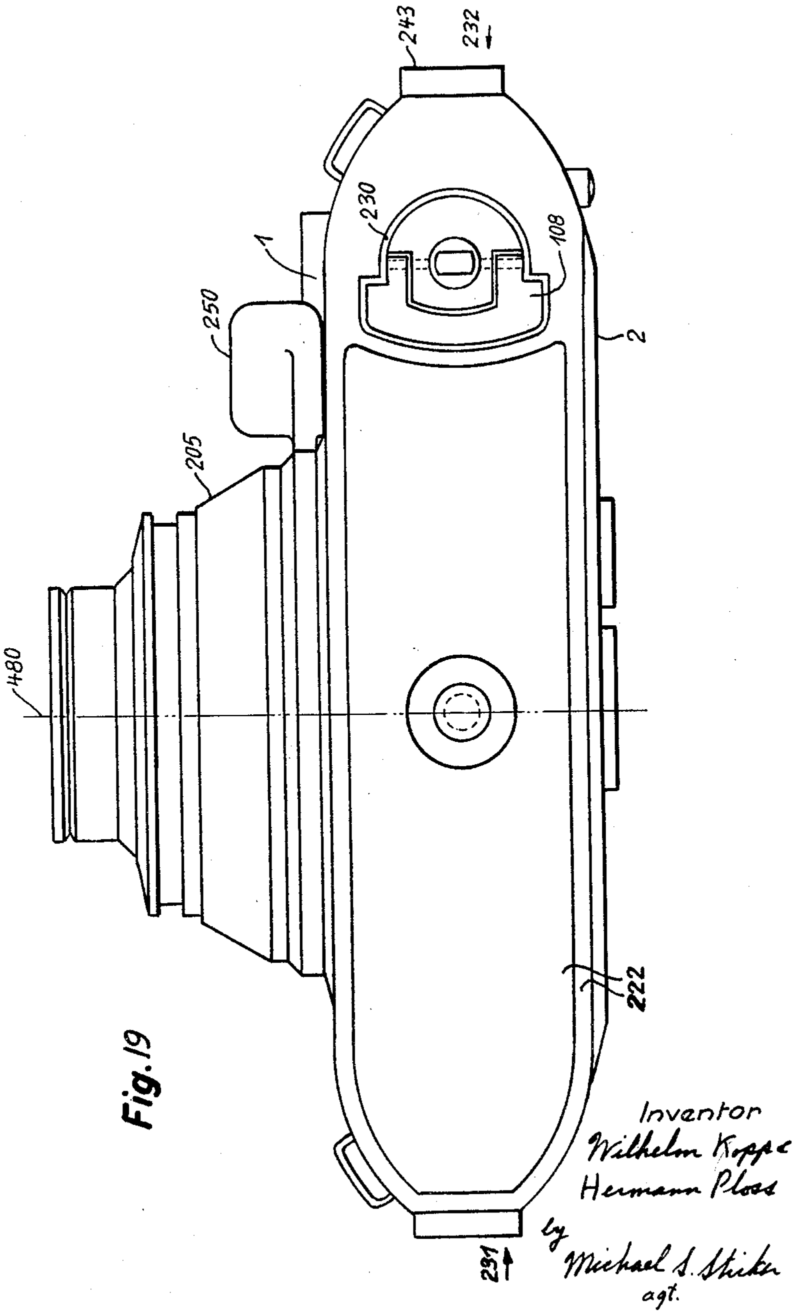
Figure 19 shows an example of an embodiment of the camera seen from below in the closed condition.

Fig. 19 shows the camera 1 seen from below with the key 108 for the locking of the camera rear wall 2 against unintentional opening. Simultaneously with this locking, owing to the transmission of the rotary movement of the coupling part 460 to the coupling part 405 of the interchangeable film holder 11, the cover slide 114 is drawn away from the picture gate of the interchangeable film holder 11, 13. With the opening of the picture gate 24, the lock of the film feed device 16, 17, 68, 75, of the interchangeable film holder 11 is released at the same time, so that the feed device of the camera 1 can be actuated through its control lever 250. Through the control lever 250 an exposure shutter (built into the tube 205) of the camera 1 is stressed at the same time and the film 10 present in the interchangeable film holder 11, 13 is fed forward by the length of a picture with suitable spacing, and the mechanism for the double exposure lock is also actuated. The key 108 is shaped in such a manner that in its locking position, as shown in Fig. 19, it rests reversed in a recess 230 corresponding to its shape in the lower hood 222 of the camera, without it projecting from the lower hood 222.

Figure 20 shows the two coupling parts 59, 405 for the actuation of the cover slide 114 of the picture gate and for the film feed. The grooves 233 and 234 of the coupling parts 59, 405 are made conical.

Figure 27:
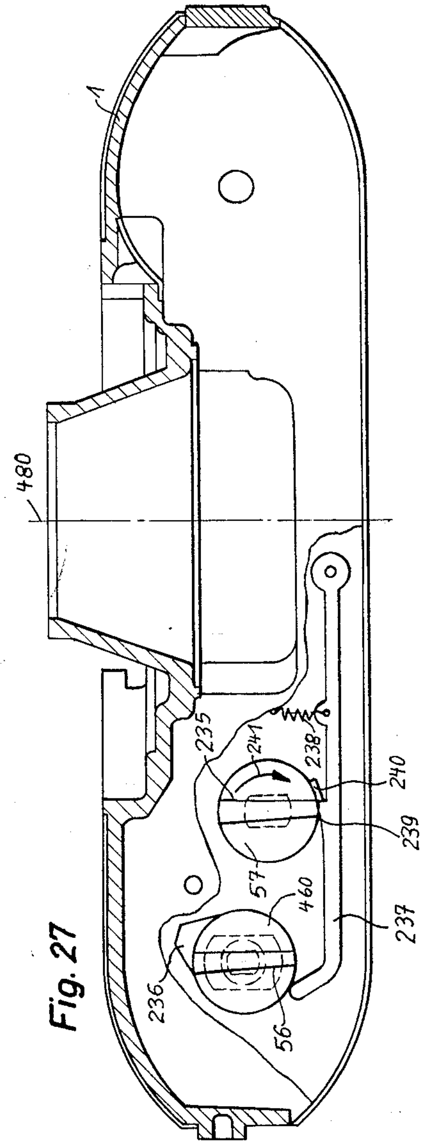
Figure 27 shows the camera with lower camera wall broken away and the locking device for the positive blocking of the film feed drive through the locking key of the camera rear wall in working position, according to the first system.

Figure 27 shows the coupling parts 57 and 460, which, with the two coupling parts 59, 405, of the interchangeable film holder 11, 13 render possible the actuation of the film feed device and of the cover slide 114 of the interchangeable film holder 11, 13. When the coupling part 460 of the camera 1 is turned by a key connected with it through 180°, this will prevent the interchangeable film holder 11, 13 from being inserted into the camera 1. The cross-piece 56 of the coupling part 460 is, just like the cross-piece 235 of the coupling part 57, made conical to correspond with the grooves 233, 234 of the coupling parts of the interchangeable film holder 11, 13.

With the coupling part 460 for the cover slide 114 a cam 236 is rigidly connected, which in the position shown in Figure 27 so acts upon a sensitive lever 237 against the action of its tension spring 238 that a locking tooth 239 on the sensitive lever 237 lies in the vicinity of a stop 240 of the coupling part 57. In this position of the sensitive lever 237 the picture gate of the interchangeable film holder 11 inserted in the camera 1 is covered by the cover slide 114. The stop 240 is rigidly connected with the coupling part 57 and therefore with the feed device of the camera 1. In the position shown in Figure 27, the feed device of camera 1 and therefore the control lever 250 are locked against rotation by the sensitive lever 237. The arrow 241 indicates in which direction for example the coupling part 57 for the film feeding of the interchangeable film holder 11 is rotated by the actuation of the control lever 250.

Figure 28:
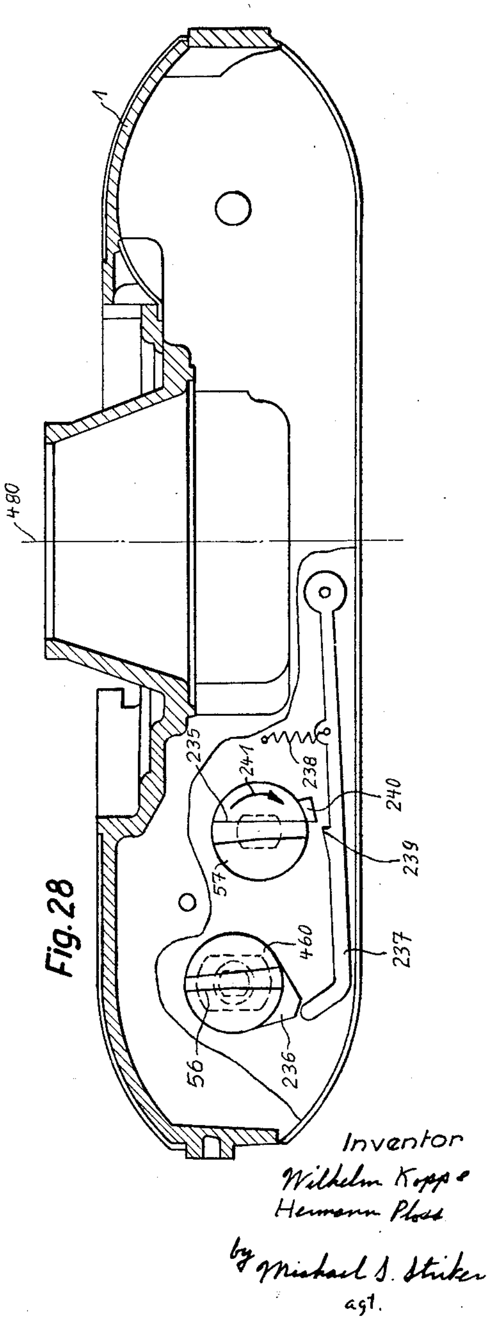
Figure 28 shows the camera according to Figure 27, but with the locking device in the unblocked position, in accordance with the first system.

Figure 28 shows the coupling part 460 turned through 180°. The cam 236 has lifted the sensitive lever 237 against the pull of its spring 238, with its locking tooth 239, out of the region of the stop 240. The control and tensioning lever 250 can now be actuated. The picture gate of the inserted interchangeable film holder 11, 13, is in the position of the coupling part 460 shown in Fig. 28 opened. The film feed device of the interchangeable film holder 11, 13 and of the camera 1, 2 with the control lever 250 can only be actuated when the coupling part 460 is turned into the position of Figure 28. The picture gate is thereby fully opened at the same time.

What we claim is:

1. For use in a camera, in combination, a magazine housing adapted to be inserted into and removed from the camera, said housing having a front wall formed with an opening through which film in the magazine housing is exposed when the magazine housing is in the camera and said opening is uncovered; a cover slide located in said housing adjacent said front wall thereof; guide means carried by said housing and guiding said slide for movement between a closed position closing said opening and an open position uncovering said opening; a drum segment turnably supported by said housing in the interior thereof, said slide being fixed at one end to said drum segment so that when the latter turns in one direction said slide becomes wound at least in part on said drum segment to be moved from said closed to said open position thereof and when said drum segment turns in an opposite direction said slide moves from said open to said closed position; and turning means carried by said housing and operatively connected with said drum segment for turning the same.

2. The combination of claim 1 and wherein a film spool is turnably supported in said magazine housing coaxially with said drum segment.

3. The combination of claim 1 and wherein said guide means extends from said drum segment to said opening of said front wall of said magazine, said guide means including an elongated substantially rigid sheet provided with elongated shoulders which cooperate with edges of said slide to guide the same.

4. The combination of claim 3 and wherein said sheet has in the region of said drum segment only a pair of arcuate arms respectively extending along circles whose centers are in the turning axis of said drum segment.

5. The combination of claim 1 and wherein said turning means includes a motion transmitting member located at the exterior of said housing and fixed with said drum segment.

6. The combination of claim 1 and wherein said turning means includes a motion transmitting member removably fixed with said drum segment, having a portion located at the exterior of said magazine housing, and having another portion extending in a light-tight manner through a wall of said housing.

7. The combination of claim 1 and wherein said magazine housing has opposed top and bottom walls, said turning means including a motion transmitting member turnably carried by one of said opposed walls and extending in a light-tight manner therethrough, said drum segment being fixed at one end to said motion transmitting member for turning movement therewith; a pin coaxial with said motion transmitting member and fixedly carried by the other of said opposed walls, the other end of said drum segment being guided for turning movement by said pin; and a film spool spindle coaxial with said motion transmitting member and pin, turnably guided at one end by said motion transmitting member, and turnably guided at its opposite end by said pin.

8. The combination of claim 1 and wherein said drum segment includes an elongated wall of arcuate cross section forming part of a cylinder except for one side edge portion of said wall curved along a smaller radius than the remainder of said wall and located inwardly of said cylinder, said cover slide overlapping and engaging said wall of said drum segment at the exterior of said wall, and a plurality of rivets fixing said slide to said side edge portion of said segment wall and having heads, respectively, which do not extend beyond said cylinder.

9. The combination of claim 1 and wherein said guide means includes an elongated substantially rigid sheet having opposed side edges stepped from the remainder of the sheet forwardly toward the front wall of said magazine housing to form shoulders for guiding said cover slide, said sheet having adjacent said drum segment only a pair of opposed arms provided with said side edges of said sheet and having a curvature about the axis of said drum segment, said sheet having distant from said arms an elongated straight portion and between the latter and said arms an intermediate portion gradually merging into said arms and straight portion to prevent sharp curvature of said slide, the front wall of said magazine being formed with elongated grooves which respectively receive said side edges of said sheet at said straight portion thereof, said arms of said sheet being fixed to the inner surface of said front wall of said magazine housing.

10. In a camera, in combination, a camera housing; a magazine housing insertable into said camera housing and being removable therefrom, said magazine housing having a front wall formed with an opening through which film in the magazine housing is exposed when the latter housing is in said camera housing and said opening is uncovered; a cover slide located in said magazne housing adjacent said front wall thereof; guide means carried by said magazine housing and guiding said cover slide for movement between a closed position closing said opening and an open position uncovering said opening; a drum segment turnably supported by said housing in the interior thereof, said slide being fixed at one end to said drum segment so that when the latter turns in one direction said slide becomes wound at least in part on said drum segment to be moved from said closed to said open position and when said drum segment turns in an opposite direction said slide moves from said open to said closed position thereof, said drum segment having a predetermined angular position when said cover slide is in said closed position thereof; and turning means operatively connected with said drum segment for turning the same, said turning means having one part carried by said camera housing and another part carried by said magazine housing and said turning means rendering said parts thereof inseparable from each other except when said parts of said turning means are in a predetermined position with respect to said housings, so that said magazine housing cannot be inserted into or removed from said camera housing except when said parts of said turning means have said predetermined position, said parts of said turning means, when they are in said predetermined position thereof, locating said drum segment in said predetermined angular position thereof, so that said opening of said front wall of said magazine will be closed when the magazine housing is inserted into or removed from said camera housing.

11. In a camera as recited in claim 10, said turning means including a wedge-shaped rib on one of said parts thereof and a mating wedge-shaped groove on the other of said parts thereof receiving said rib to render said parts inseparable except when they are in said predetermined position with respect to said housings.

12. In a camera, in combination, a camera housing; a magazine housing insertable into and removable from said camera housing; a first member turnably carried by said magazine housing for actuating a cover slide which covers and uncovers an exposure opening of said magazine housing; a second member turnably carried by said magazine housing for transmitting turning movement to a film transporting device in said magazine housing; releasable lock means carried by said magazine housing and locking said first and second members against turning movement when said magazine housing is out of said camera housing; and release means carried by said camera housing and located in the path of movement of said lock means during introduction of said magazine housing into said camera housing for automatically engaging and releasing said lock means when said magazine housing is placed in said camera housing and for maintaining said lock means in a released position while said magazine housing remains in said camera housing.

13. In a camera as recited in claim 12, said first and second members being respectively formed with cutouts and said releasable lock means including a pivot pin carried by said magazine housing between said first and second members, a pair of levers turnable on said pivot pin and respectively having free ends located in said cutouts to prevent turning of said members, respectively, said levers respectively having lever arms distant from said free ends thereof, and spring means cooperating with said levers for urging said free ends thereof into said cutouts, said release means including a release pin fixedly carried by said camera housing and located in the path of movement of said lever arms during introduction of said magazine housing into said camera housing for engaging said lever arms and turning said levers in directions which remove said free ends of said levers respectively from said cutouts by the time said magazine housing is located in its final position in said camera housing.

14. In a camera as recited in claim 13, said spring means being in the form of a single wire spring having an intermediate portion coiled at least in part around said pivot pin and having free ends engaging said levers.

15. In a camera, in combination, a camera housing adapted to receive a magazine in its interior; a first member turnably carried by said camera housing for cooperating with a magazine in the housing to move a cover slide on the magazine to an open position during turning of said first member from an inactive angular position to an active angular position; a second member turnably carried by said camera housing for driving a film transporting mechanism of the magazine; a projection carried by said second member; a lever turnably carried by said camera housing and having a projection engaging said projection of said second member to prevent turning of the latter; spring means cooperating with said lever for urging the same to a position where said lever projection engages said projection of said second member; and a cam carried by said first member for turning movement therewith and engaging said lever during turning of said first member from said inactive to said active position thereof to turn said lever for moving the projection of the latter away from the projection of said second member to release the latter, said cam maintaining said lever in a position which locates the projection thereof out of the path of movement of the projection of said second member while said first member is in said active position thereof, whereby said second member cannot be operated until said first member operates to move the cover slide of the magazine to an open position.

References Cited in the file of this patent

UNITED STATES PATENTS

| | | |
|---|---|---|
| 2,022,362 | Porter | Nov. 26, 1935 |
| 2,172,337 | Mihalyi | Sept. 5, 1939 |

FOREIGN PATENTS

| | | |
|---|---|---|
| 834,548 | France | Oct. 22, 1938 |
| 933,275 | France | Dec. 17, 1947 |